(12) United States Patent
Wang et al.

(10) Patent No.: US 12,367,039 B2
(45) Date of Patent: *Jul. 22, 2025

(54) EMBEDDED TERMINALS REMOTE ONLINE DEVELOPMENT SYSTEM

(71) Applicant: SOOCHOW UNIVERSITY, Suzhou (CN)

(72) Inventors: Yihuai Wang, Suzhou (CN); Lianmin Shi, Suzhou (CN); Xiaofang Zhang, Suzhou (CN); Wangshu Yao, Suzhou (CN); Qiang Liu, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 89 days.

This patent is subject to a terminal disclaimer.

(21) Appl. No.: 17/761,793

(22) PCT Filed: Oct. 9, 2021

(86) PCT No.: PCT/CN2021/122780
§ 371 (c)(1),
(2) Date: Nov. 3, 2022

(87) PCT Pub. No.: WO2022/227411
PCT Pub. Date: Nov. 3, 2022

(65) Prior Publication Data
US 2024/0045672 A1    Feb. 8, 2024

(30) Foreign Application Priority Data

Apr. 29, 2021   (CN) .......................... 202110472342.3

(51) Int. Cl.
*G06F 8/77* (2018.01)
*G06F 8/65* (2018.01)
(Continued)

(52) U.S. Cl.
CPC .................. *G06F 8/77* (2013.01); *G06F 8/65* (2013.01); *G06F 11/3636* (2013.01); *G06F 11/3698* (2025.01)

(58) Field of Classification Search
CPC ........ G06F 11/36; G06F 8/34; G06F 11/3409; G06F 11/3466
See application file for complete search history.

(56) References Cited

U.S. PATENT DOCUMENTS

| 5,497,456 A | 3/1996 | Alexander et al. |
| 8,533,678 B2 * | 9/2013 | Halter ................. G06F 11/3648 717/124 |

(Continued)

FOREIGN PATENT DOCUMENTS

| CN | 106952425 A | 7/2017 |
| CN | 111756858 A | 10/2020 |

(Continued)

*Primary Examiner* — Duy Khuong T Nguyen
(74) *Attorney, Agent, or Firm* — SZDC Law PC

(57) ABSTRACT

An embedded terminals remote online development system is divided into three parts: an embedded terminal, a cloud forwarding platform and an IDE. Under remote online development, the cloud forwarding platform establishes a communication connection with the IDE through the Internet and establishes a connection with a communication module of the embedded terminal through a communication base station, so that the communication between the IDE and embedded terminal is completed. To be compatible with a local development mode, it is also possible to establish a connection between the IDE and the embedded terminal in a wired manner such as serial communication, to realize local online development. The embedded terminals remote online development system with good universality and flexibility is established in combination with a cloud platform, so the development difficulty of embedded terminals is lowered, repetitive work during development is reduced, (Continued)

development cycle is shortened, and development cost is reduced.

6 Claims, 3 Drawing Sheets

(51) Int. Cl.
*G06F 11/362* (2025.01)
*G06F 11/3698* (2025.01)

(56) References Cited

U.S. PATENT DOCUMENTS

| | | |
|---|---|---|
| 2007/0043833 A1 | 2/2007 | Lu et al. |
| 2015/0154017 A1 | 6/2015 | Yuan et al. |
| 2017/0075792 A1* | 3/2017 | Udvuleanu ......... G06F 11/3636 |
| 2021/0271589 A1* | 9/2021 | Denkel ............... G06F 11/3698 |

FOREIGN PATENT DOCUMENTS

| | | |
|---|---|---|
| CN | 112416443 A | 2/2021 |
| CN | 113110859 A | 7/2021 |

* cited by examiner

EMBEDDED TERMINALS REMOTE ONLINE DEVELOPMENT SYSTEM

This application is the National Stage Application of PCT/CN2021/122780, fined on Oct. 9, 2021, which claims priority to Chinese Patent Application No. 202110472342.3, filed on Apr. 29, 2021, which is incorporated by reference for all purposes as if fully set forth herein.

BACKGROUND OF THE INVENTION

1. Technical Field

The invention relates to the technical field of software development and debugging, in particular to an embedded terminals remote online development system.

2. Description of Related Art

The IoT technology, generated with the development of the computer technology, the Internet technology and the sensor technology, and is a network that connects any object to the Internet through information sensing devices, in accordance with agreed protocols, for information exchange and communication to achieve intelligent identification, positioning, tracking, monitoring and management, and is an extension and expansion on the basis of the Internet.

The popularity of IoT applications allows various complex terminal devices with different application needs to access the Internet. These terminals are the "source" of the IoT, and embedded terminals are often preferably used as IoT development terminals because they are highly targeted, good in operational capacity and reliability, small in size and good in portability. With the rise of the demand for remote deployment of the terminals, there has been a shift in the development mode of the embedded terminals from local development to remote development in recent years. However, there is little research on remote online development systems for embedded terminals, and a complete system that are compatible with different communication modules and different types of embedded terminals is not available.

The software and hardware design of embedded terminals often has a high technical threshold, which is mainly manifested in the following aspects: software and hardware collaborative design is needed, and software, hardware and multi-industry knowledge is involved; some systems have high real-time requirements; many IoT intelligent products must have high anti-interference and stability; and software and hardware joint tests have to be carried out frequently during the development process. Therefore, product development based on embedded terminals is plagued by high costs, long cycles, and difficulty in ensuring the stability. It also puts higher requirements for the comprehensive development ability of technicians. In order to integrate the common elements of embedded terminal development to improve development efficiency, an efficient software and hardware architecture is urgently needed.

During most embedded application and development in China, imported microcontroller units (MCU) are used, and embedded integrated development environments (IDEs) are often chip-dependent, which poses a new challenge to embedded development. For embedded development with different MCUs, developers need to re-adapt to different IDEs. In addition, the embedded IDEs are often difficult to provide common and efficient support for underlying applications, and especially in the scenario such as configuration of underlying registers, the process is cumbersome, and the operability is poor. The poor compiling adaptability and simplex program update mode are also two major drawbacks of current embedded IDEs.

BRIEF SUMMARY OF THE INVENTION

The objective of the invention is fulfilled through the following technical solution.

Based on the above, the invention aims to solve the problem of high development threshold of embedded terminals, give a common hardware and software architecture, design a remote program updating and remote software debugging solution that is compatible with different communication modules to get rid of the dependence of software debugging on additional hardware, and provide a common and efficient IDE.

Specifically, the invention provides an embedded terminals remote online development system, comprising:

An embedded terminal, a cloud forwarding platform and an IDE module, wherein the cloud forwarding platform establish a communication connection with the IDE module through the Internet, and establishes a connection with a communication module of the embedded terminal through a communication base station; and the IDE module established a connection with the embedded terminal in a wired manner.

Further, a hardware platform of the embedded terminal comprises a master chip minimal system, a communication module and a peripheral circuit thereof, a power conversion circuit, and an access sensor.

Further, the embedded terminal and the IDE module uplink and downlink data to the cloud forwarding platform with a fixed IP address, and the cloud forwarding platform is response for forwarding data, so that information exchange between the embedded terminal and the IDE module is completed.

Further, the IDE module has functions of code editing, code analysis, program compilation, software debugging, software updating, and memory reading/writing.

Further, the cloud forwarding platform is response for forwarding data between the embedded terminal and the IDE module.

Further, the cloud forwarding platform comprises a cloud server and a developer computer, a server side of an intranet traversal software FRP runs on the cloud server, a client side and a cloud forwarding program of the intranet traversal software FRP run on the developer computer, and an address and a port of the cloud server are mapped onto the developer computer.

Further, the code editing function comprises: writing and deleting of codes, line annotation and paragraph annotation of codes, text finding and replacing in files, text finding and replacing in projects, code format unification, and jumping between variable/function declarations and definitions.

Further, the program compilation function completes program compilation in a GNU cross-compiling mode, with a GCC compiler supporting multiple languages and target device extension as a tool.

Further, the IDE module is capable of entering remote updating of embedded terminal software, comprising:

Sending dynamic command data to a user port, and writing the dynamic command data by a user program;

Sending a system instruction for program jumping to the user port, and jumping to BIOS after the user program receives the system instruction;

Calling a dynamic command function by default during a BIOS starting process; modifying a program running state in a dynamic command first to complete a stay in BIOS; then, completing initialization and interrupt enable of the user port; setting an address of an interrupt service routine corresponding to the user port in a BIOS program interrupt vector table as the dynamic command function; finally, informing an upper computer that relevant initialization steps have been executed and a program update is to be started;

Starting to send data frames of the user program to the user port by the upper computer, and receiving, checking and writing the data frames of the user program by the terminal by means of the dynamic command from the user port; and When the dynamic command from the user port finishes processing the last frame of data, modifying the program running state, resetting BIOS, and completing subsequent guidance on the user program by means of a BIOS basic process.

Further, the IDE module is capable of entering remote debugging of embedded terminal software, comprising:

Dynamically loading a software debugging program by means of a dynamic command system in a BIOS project, and providing a specific implementation of a necessary function for debugging in a dynamic command;

Completing relevant settings of a breakpoint by means of a flash address reloading and breakpoint unit, and outputting corresponding debugging information in a debug monitoring exception responsible for capturing the breakpoint; and Carrying out remote software debugging by means of a full-run mode, a run-by-statement mode, a run-by-process mode and a suspend mode.

The invention has the following advantages: the embedded terminals remote online development system with good universality and flexibility is established in combination with a cloud platform, so that the development difficulty of embedded terminals is lowered, repetitive work during development is reduced, the development cycle is shortened, and the development cost is reduced.

DETAILED DESCRIPTION OF THE INVENTION

Illustrative implementations of the disclosure will be described in further detail below with reference to the accompanying drawings.

Figure 1:
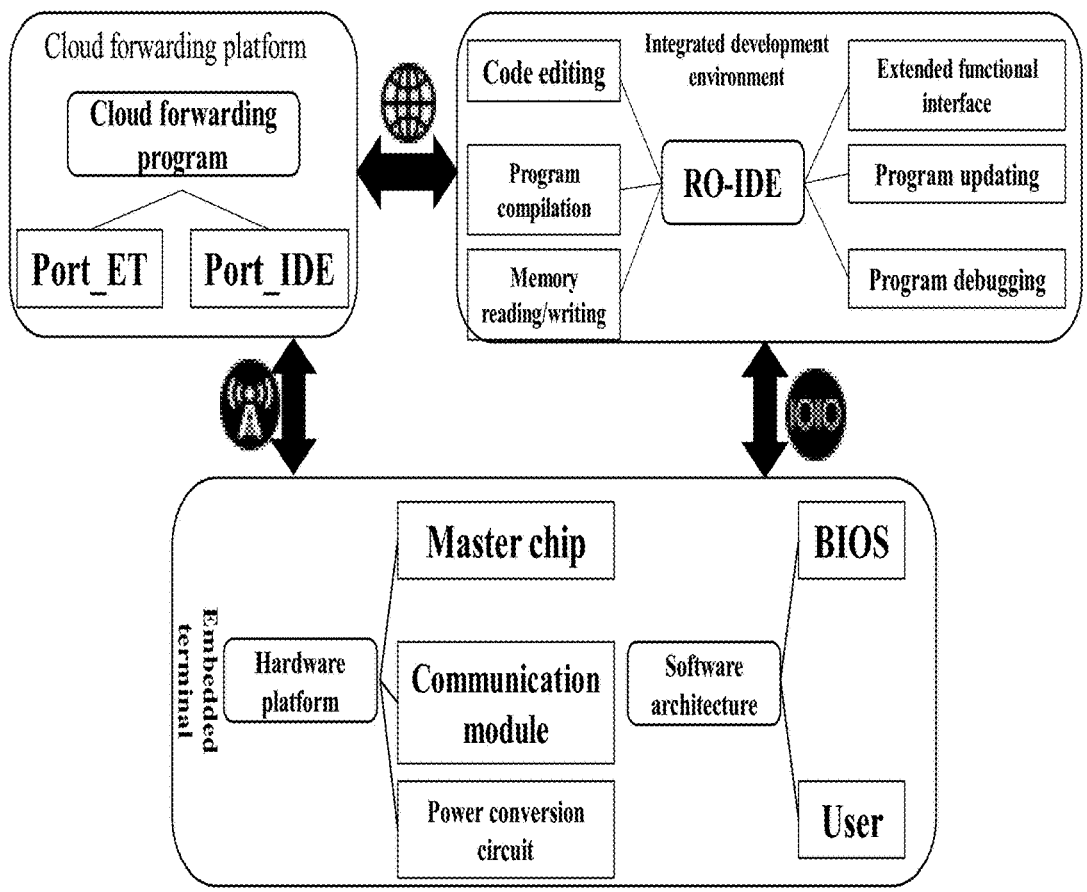
FIG. 1 illustrates a structural diagram of an embedded terminals remote offline development system according to one implementation of the invention.

It can be known, by analyzing the remote online development method for embedded terminals, that an IDE, as the main development site for developers, and an embedded terminal, as the main development object, are two important parts of an embedded terminals remote online development architecture. Under the background of remote online development, in addition to embedding a communication module in an embedded terminal, and a cloud forwarding platform needs to be introduced to connect the embedded terminal to the IDE. Thus, the invention proposes an Embedded Terminals Remote Online Development System (ET-RODS), the architecture of which is shown in FIG. 1. The embedded terminals remote online development system is mainly divided into three parts: an embedded terminal, a cloud forwarding platform and an IDE. Under the background of remote online development, the cloud forwarding platform establishes a communication connection with the IDE through the Internet, and establishes a connection with a communication module of the embedded terminal through a communication base station, thus completing the communication between the IDE and the embedded terminal. In order to be compatible with a local development mode, it is also possible to establish a connection between the IDE and the embedded terminal in a wired manner such as serial communication, to realize local online development.

(1) Embedded terminal: a hardware platform of the embedded terminal typically consists of a master chip minimal system, a communication module and a peripheral circuit thereof, a power conversion circuit and other auxiliary circuits, and constitutes a hardware entity with an information collection and control function, together with an access sensor. The software part of the embedded terminal is used by developers to design and fulfill specific functions with an MCU as the core, and completes the functions of data collection, transmission, storage, control and operation in combination with hardware.

(2) Cloud forwarding platform: the cloud forwarding platform, as a bridge of data transmission, connects the embedded terminal to the IDE, is responsible for transmitting instructions from the IDE to the embedded terminal, and is also responsible for feeding the execution condition of the instructions received by the embedded terminal back to the IDE. Considering that it is difficult to connect the IDE to the embedded terminal with a fixed IP address and it means to a large extent that embedded terminal software has to be updated once the IP address of the IDE changes, the cloud forwarding platform is introduced. To solve this problem, the cloud forwarding platform is introduced as a data forwarding server with a fixed IP address. With this bridge, both the embedded terminal and the IDE are able to uplink and downlink data to the cloud forwarding platform with the fixed IP address, and the cloud forwarding platform is responsible for forwarding data, thus completing the information exchange between the embedded terminal and the IDE.

(3) IDE: the IDE is the main site for software development of embedded terminals and generally has the functions such as code editing, code analysis, program compilation, software debugging and program updating. Under the background of remote online development, the functions such as software debugging and program updating need to establish a communication connection with the cloud forwarding platform to transmit data to the embedded terminals to complete the corresponding functions.

1 Design of the Embedded Terminal

The construction of the hardware platform and the design of the software architecture are two core parts of the design of the embedded terminal. The hardware platform provides a basic program running environment for the software architecture, while the software architecture communicates with hardware to ensure that hardware resources are fully used.

1.1 Construction of the Hardware Platform of the Embedded Terminal

The invention constructs the hardware platform mainly based on a master chip, a power conversion circuit and communication-related modules, and designs a basic measurement and control system with the aid of the design of external interfaces hardware components.

1. Model Selection of the Master Chip

An STM32L431RC chip is selected as the master chip of the embedded terminal.

2. Power Conversion Circuit

An external power supply for the embedded terminal is generally 5V, and the most typical power supply mode is USB (Universal Serial Bus) power supply; while the operating voltage of the STM32L432RC chip is 3.3V, and most communication modules support a 3.3V supply voltage, so it is necessary to introduce a 5V to 3.3V power conversion chip. A power conversion chip TPS70933 which is low in power consumption and is provided with enable pins is adopted in the invention.

3. Model Selection and Circuit Design of the Communication Module

An ME3616NB-IoT communication module is selected. Circuits related to the communication module comprise a communication module minimal system, a UART level conversion circuit, an eSIM card circuit, a main antenna and GNSS antenna circuit, and the like. Through the combination of these circuits, the interaction between the MCU and the communication module and the interaction between the communication module and a remote server are realized.

(1) ME3616 minimal system circuit: the ME3616 minimal system circuit communicates with the MCU in various manners, and selects an UART as a communication interface for AT instructions for data transmission; and the ME3616 minimal system circuit is also connected to an eSIM card and an antenna and is provided with firmware updating and debugging interfaces.

(2) UART level matching circuit: the operating voltage of a UART module of the ME3616 communication module is 1.8V, while the operating voltage of a UART module of the corresponding STM32L431RC chip is 3.3V, so this circuit is designed for conversion to achieve data communication between serial ports.

(3) eSIM card circuit: the ME3616 communication module does not comprise a SIM card, so a circuit needs to be additionally designed to access to the communication module; and in order to reduce the size, an eSIM card is accessed to the communication module, as a fixed part.

(4) Main antenna and GNSS circuit: a main antenna and GNNS antenna module is disposed in the ME3616 communication module to improve the signal intensity and positioning accuracy and to facilitate core network attachment, data communication and GPS positioning.

4. Design of the Basic Measurement and Control System

Figure 2:
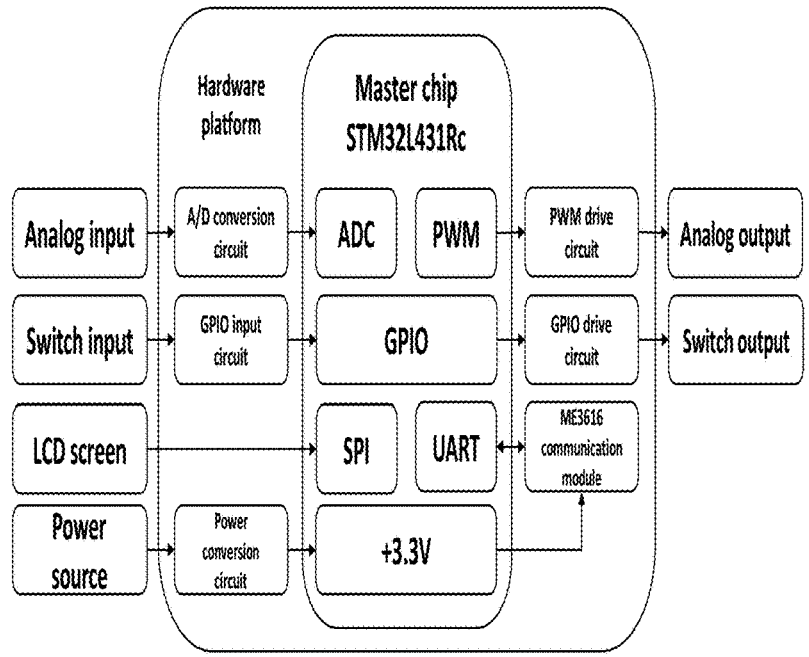
FIG. 2 illustrates an overall block diagram of an embedded terminal measurement and control system according to one implementation of the invention.

Based on the previous model selection and design of hardware, the invention provides a remote information transmission function with the MCU as the core, in combination with the ME3616 communication module, and forms the hardware platform based on the power conversion circuit. In addition, sensors and actuators can be accessed by means of external interfaces to achieve input and output of signals, thus realizing measurement and control of the measurement and control system, as shown in the FIG. 2.

The input and output of analog and switch quantities together realize the information acquisition and control functions of the measurement and control system, and if the sensors or actuators to be connected to external devices are well packaged, the interface circuit can be designed directly. If the sensors or actuators are not packaged, the packaging design of corresponding circuits should be completed first in accordance with the component-based design idea, and then the interface circuit is designed to ensure the portability and reusability of peripheral modules.

In addition, an LCD screen of the external devices exchanges information with the MCU mainly through SPI communication, while the communication module in the hardware platform exchange information with the MCU through serial communication (UART), both of which require the design of corresponding interface circuits according to the corresponding communication modes.

In addition to the communication module integrated into the hardware platform, certain external interfaces should be designed for the access of the other external devices to facilitate the combined application of the modules. The overall block diagram of the measurement and control system shows that these external devices mainly include an analog input and output device, a switch input and output device and an LCD screen.

Wherein, in the aspect of hardware wiring, the analog input and output device and the switch input and output device both adopt a three-wire connection mode, which is realized by means of a power pin, a ground pin and a function pin respectively. In addition, considering the different power supply requirements of these devices, the parameters of the power pins should be reasonably designed. The LCD screen carries out data exchange through SPI communication with the MCU, so in addition to an MISO pin, an MOSI pin and a CLK pin of SPI, a BLK pin, a DC pin and an RES pin should be connected to GPIO function pins in the MCU, to fulfil the functions such as resetting, backlight, and data/command selection of the LCD screen, and an eight-pin peripheral interface is formed together with a power line and a ground line.

1.2 Design of the Software Architecture of the Embedded Terminal

This invention adopts the design idea of the GEC software architecture to design the software architecture of the embedded terminal. The following will elaborate the design of the GEC software architecture under an STM32L431RC chip in three aspects of project division, space division and function division.

1. Project Division of the General Embedded Computer (GEC) Software Architecture As mentioned above, the GEC software architecture is divided into two parts: a BIOS project and a User project.

(1) BIOS project: the BIOS project is a relatively fixed and complete project, and developers do not need to consider the specific implementation of the BIOS project, and cannot interfere with the BIOS project either. As a precursor to the User project, the BIOS project provides a stable environment to which the User project can return, and the BIOS project is a running basis for the rich functions of the GEC architecture.

TABLE 5-1

| Architecture of the BIOS project | |
|---|---|
| Project directory | Description |
| 01_Doc | Document folder, storing project-related explanatory documents |
| 02_CPU | Core folder, containing chip core-related documents |
| 03_MCU | MCU-related document folder |

TABLE 5-1-continued

Architecture of the BIOS project

| Project directory | Description |
|---|---|
| .../mcu.h | MCU-related basic information, macro constants, etc. |
| .../Linker_file | Link folder, containing link script inventions |
| .../MCU_drivers | Underlying driver files, mainly flash, gpio and uart, including corresponding header files and source files |
| .../Startup | Chip startup files, including chip startup files, header files, etc. |
| 04_GEC | Architecture-related documents, containing information such as definitions and macro constants for the core functions of the architecture |
| 05_UserBoard | Application driver files, such as emuart components and ueupdate components |
| 06_SoftComponent | Software driver files, such as TypeConversion components, OS resident files |
| 07_NosPrg | Project main program folder without operating system |
| .../includes.h | Project header file |
| .../isr.c | Interrupt handling file |
| .../main.c | Main function execution file |
| Debug | Compiling debug information files |

(2) User project: the structure of the User project and the meanings of all folders are shown in Table 5-2.

TABLE 5-2

Architecture of the User project

| Project directory | Description |
|---|---|
| 01_Doc | Document folder, storing project-related explanatory documents |
| 02_CPU | Core folder, containing chip core-related documents |
| 03_MCU | MCU-related document folder |
| .../mcu.h | MCU-related basic information, macro constants, etc. |
| .../Linker_file | Link folder, containing link script inventions |
| .../MCU_drivers | Underlying driver files, mainly flash, gpio and uart, including corresponding header files and source files |
| .../startup | Chip startup files, including chip startup files, header files, etc. |
| 04_GEC | Architecture-related documents, containing information such as definitions and macro constants for the core functions of the architecture |
| 05_UserBoard | Application driver files, such as emuart components and printf components |
| 06_SoftComponent | Software driver files, such as operating system function interface files |
| 07_AppPrg | Project main program folder |
| .../includes.h | Project header file |
| .../isr.c | Interrupt handling file |
| .../main.c | Main function execution file, with operating system being started or not started |
| .../threadauto_appinit.c | Operating system example files, which can be deleted as required |
| Debug | Compiling debug information files |

The User project is truly a developed project that can be directly programmed by the developer without the perception of BIOS. For the developers, the User project is just a general project reserved with a clear folder structure and rich optional functions.

Particularly, different from normal chip startup steps, an inheritance operation on an interrupt vector table in the BIOS project needs to be performed before the User project finishes a series of system initializations and moves on to the main function run. Taking the GEC architecture of STM32 as an example, the main steps are as follows:

First, interrupt vector tables of the BIOS and the User project are read, and a sector where the interrupt vector table of the User project is located is erased; second, an address table entry of a serial interrupt handling function, which is used for program updating of the User project, in the interrupt vector table of the BIOS project is copied to a corresponding position of the interrupt vector table read out from the User project, and is written back into the corresponding sector. Finally, a global interrupt vector table pointer of the system is modified to point to the interrupt vector table of the User project.

2. Space Division of the GEC Software Architecture

The storage space of the MCU is divided into two main parts: Flash and SRAM, so the space division of the GEC software architecture is described in terms of these two parts: Flash and SRAM.

(1) Flash partition of the chip: the Flash of the chip is divided into a BIOS zone and a User zone, wherein the BIOS zone is divided into five parts: an interrupt vector table, a main code area, a dynamic command area, a component function list area and a component function code area, and the User zone is divided into an interrupt vector table and a main code area.

The interrupt vector table of BIOS stores the addresses of interrupt service routine functions corresponding to all interrupts; the main code area is a Flash space occupied by a common project and mainly contains functions and necessary data in the project; the dynamic command area is a piece of Flash space reserved for dynamic injection of temporary codes and is part of the dynamic command system; the component function list area is used to store call addresses of all functions in a dynamic component library; and the component function code area is used to store specific implementations of these functions, and is part of the dynamic component library. The function list area is used to store call addresses of the functions in the dynamic library, the function code area is used to store concrete implementations of these functions, and both the function list area and the function code area are one part of the dynamic library.

The interrupt vector table and the main code area in User correspond to the interrupt vector table and the main code area in BIOS and have the same functions as the interrupt vector table and the main code area in BIOS.

(1) SRAM partition of the chip: the SRAM space in the chip is also used by both BIOS and User. First of all, for each project, the SRAM space is divided into a data segment, a bss segment, a heap segment and a stack segment, wherein the data segment stores global variables and static variables that have been initialized and have a value which is not zero; the bss segment stores global variables and static variables that have not been initialized or initialized and have a value of 0; the heap segment is generally allocated and freed dynamically by a programmer, for example, a space is dynamically applied and freed in a stack area using a malloc or free function in the C language; the stack segment is automatically allocated by a compiler and holds local variables and parameters in functions; and the data segment, the bss segment and the heap segment are arranged from a low address to a high address, while the stack segment is allocated downwards from a high address.

Due to the fact that the SRAM space of the MCU is limited relatively and is affected by the field allocation manner of the SRAM space, to ensure a zero crossover of the SRAM space of BIOS and User, the SRAM space has to be divided into two parts, which not only increases the design difficulty of BIOS (seeking for the smallest SRAM occupation for BIOS), but also inevitably leads to a waste of SRAM in BIOS.

After a jump from the BIOS program to the User program, the temporary variables in the heap segment and the stack segment in the SRAM space of BIOS are not needed anymore, while the data segment and the bss segment still need to be retained because the update of the User program and other functions depends on the data segment and the bss segment.

In view of this, the allocation of the SRAM space is designed. That is, BIOS still occupies the entire SRAM space, while the SRAM start address of User is set behind the bss segment of BIOS. In this way, before BIOS jumps to User, BIOS occupies the ensure SRAM space because the User program does not run at this time; after BIOS jumps to User, BIOS no longer uses the heap and stack segments, and User makes full use of the SRAM space that is no longer be used by BIOS. Thus, the SRAM space is used to the maximum extent.

3. Function Division of the GEC Software Architecture

The function division of the GEC architecture is performed mainly in two aspects: the BIOS project and the User project.

(1) Functions of the BIOS project: the functions of the BIOS project are divided into two main parts, one is the injection and operation of dynamic functions based on the dynamic command system, and the other is the updating, resetting, termination and guidance of local programs of the User project.

The updating of the local programs of the User project means that BIOS obtains a machine code of the User project through a certain communication method (generally serial communication) and writes the machine code into Flash from a start address of a specified User program area after erasing an old version of the project. In most cases, the program cannot update itself while running, so when there is a need to update the User project, the running environment of the system will be switched from the User project to the BIOS project, and the BIOS project is responsible for subsequent reception, verification and writing of the machine code. Taking the GEC architecture of STM 32 as an example, the main steps for updating the local programs of the User project are as follows:

The integrated development environment (hereinafter referred to as IDE) sends a handshake signal to a serial port of a target chip; the target chip gives a response to the handshake signal from the IDE; the IDE sends main information of this update to the target chip, and after receiving the main information, the target chip prepares to terminate and erase the current User, and gives feedback; the IDE starts to send data frames to the target chip, and only when receiving the feedback from the target chip on the current frame, the IDE will continue to send a next data frame; after receiving the last data frame with a special mark, the target chip will perform a check, and when the check is correct, a hot reset will be performed; and the BIOS project carries out subsequent guidance on the User project.

The remote program updating for the User project is implemented with the aid of the dynamic command system. Several tasks of the BIOS architecture during local program updating will be further explained here:

First, jump and stay in BIOS: when the IDE sends main update information to the chip, a variable marking the update state in BIOS will be modified within a serial port interrupt, and a soft reset function of a core is called to pull the chip back to BIOS. Before a regular User program jump is executed, a gcUpdateFlag variable will be detected, so that the User program will not jump and will stay in BIOS to run.

Second, retransmission of data frames: during the process of sending, receiving and writing updated data frames, the check of a current frame may fail due to the factors such as unstable communication, and in this case, the terminal will re-request the current frame from the IDE and try again until the check succeeds or an error warning will be sent when the number of errors exceeds an upper limit.

Finally, the format of serial update data frames is given, which is shown in Table 5-3.

TABLE 5-3

Protocol for serial update data frames

| Field | Byte length | Contents |
| --- | --- | --- |
| frameHead | 2 | 0xa5, 0x06 |
| dataLength | 2 | Valid data length |
| cmd | 1 | Command word |
| data | n | Valid data |
| crc | 2 | crc checksum |
| frameTail | 2 | 0xb6, 0x07 |

Reset and termination of the User project: during actual development, the chip may stop running because of unpredictable errors of the user project. In order to run the User project again, the chip may be hot reset back to the BIOS project by means of a key reset and the User project is re-guided.

However, when the User project is updated, the chip may resume normal running only for a short period of time by a reset because the error of the User project still exists, which makes it difficult to ensure that the User project can be updated properly by the chip. In this case, the current User project has to be terminated, which, in the GEC architecture of STM32, is achieved by quickly and successively triggering the key reset of the chip six times, so that the BIOS project will no longer guide the User project, and the User project will stay in the BIOS project and will not run until a next User project update. The time of key reset is controlled here to eliminate the dependence on a timer, which allows more resources to be reserved for the specific application development of the User program, mainly by giving a one-second delay consisting of a cycle after each key reset, and a button for the next key reset must be pressed within this second, otherwise if the total number of key resets is less than six after this delay, the number of key resets will be cleared and will not retained in the BIOS, and vice versa.

Particularly, after the User project is terminated, the User project may be re-guided by the BIOS project by means of a cold reset on the target chip under the condition that the User project is not updated.

Guidance on the User project: the guidance on the User project means that the target chip runs in the BIOS project in the initial stage and will jump from the BIOS project to the User project to run when the BIOS project detects the presence of the User project or the BIOS project just completes a download or update of the User project. In addition to a variable marking the update state, a first 32-bit constant (Main Stack Pointer, MSP) in the start address of the User project should also be read and compared with the maximum value of the SRAM space of the chip; if the first 32-bit constant is the same as the maximum value of the SRAM space of the chip, it indicates that the User project has been written, and a jump can be carried out.

(1) Functions of the User project: the functions of the User project, which is directly programmed by developers, are determined by the developers, and common functions during embedded development include the collection and storage of sensor data, the connection and data sending and receiving of the cloud forwarding platform, and the operation of a hardware actuator.

2 Design of the Cloud Forwarding Platform

Under the background of remote online development of embedded terminals, it is difficult to ensure that a developer PC has a fixed IP address and it is difficult for the terminal communication module to directly exchange data with the IDE, so it is necessary to use a server with a fixed IP address as a cloud forwarding platform to complete data forwarding, and a program running on the cloud forwarding platform is called a cloud forwarding program.

2.1 Design of the Cloud Forwarding Program

Figure 3:
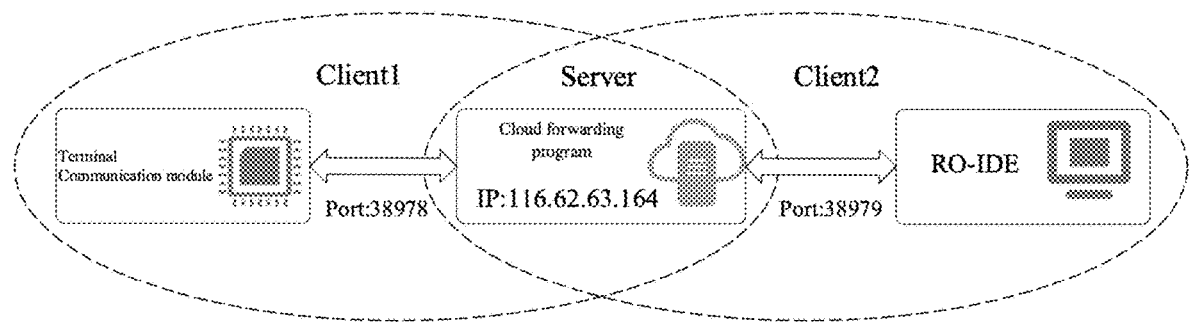
FIG. 3 illustrates a model diagram of a cloud forwarding program according to one implementation of the invention.

A model of the cloud forwarding program is shown in FIG. 3. As can be seen from FIG. 3, the cloud forwarding program mainly involves two ports, one of which is for the embedded terminal and the other one for the IDE.

The main function of the cloud forwarding program is to forward data between the embedded terminal and the IDE, without any data processing.

2.2 Construction of a Temporary Cloud Platform

In response to the lack of a cloud platform for developers of small-scale embedded applications, ten ports 7000 to 7009 of a cloud server "116.62.63.164" with a fixed IP address are reserved to serve these developers and also to support developers who use the ET-RODS model of the invention for initial tests during system construction. A server side of an intranet traversal software, Fast Reverse Proxy (FRP), runs on the cloud server to map the address and port of the cloud server to a developer computer, such that the developer computer is able to serve as a temporary cloud forwarding platform.

1. FRP Intranet Traversal

Figure 4:
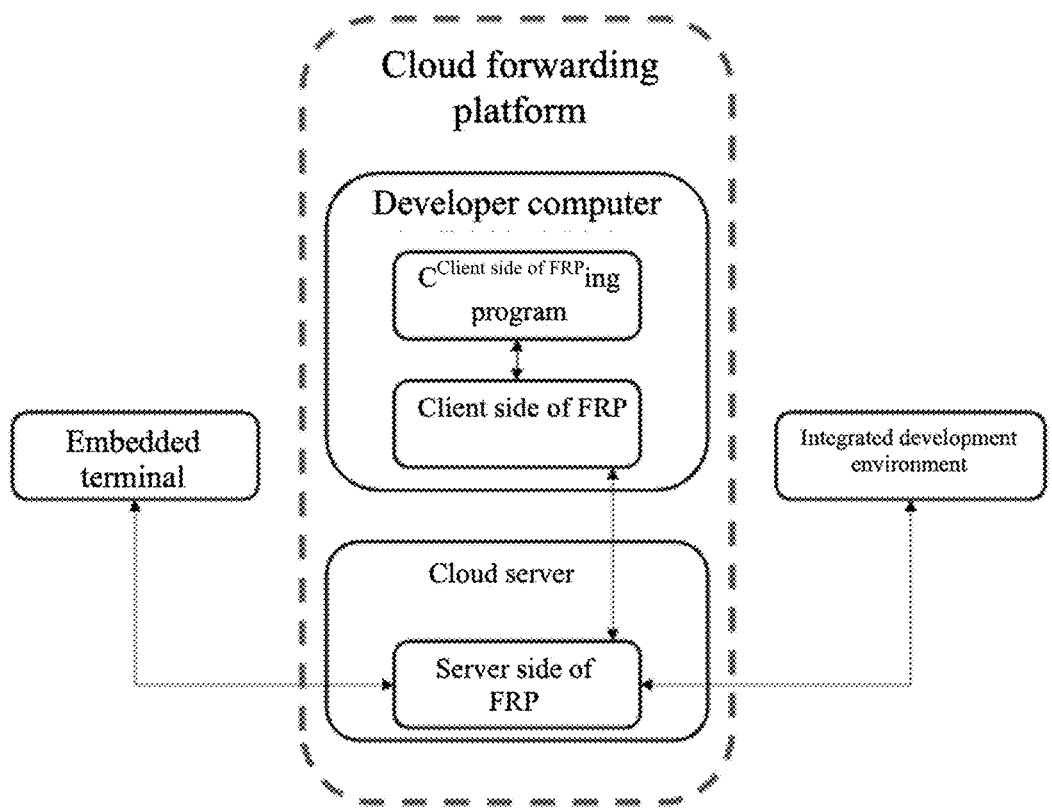
FIG. 4 illustrates a topologic diagram of FRP intranet traversal according to one implementation of the invention.

The network principle for using FRP intranet traversal may be understood with reference to FIG. 4. Developers can install the cloud forwarding program on their own computer and also install an FRP client software on this computer, and the FRP client software establishes a connection with an FRP server software on the cloud server. The FRP server software maps the cloud forwarding program on an intranet to a public IP of the cloud server. The developer computer accessing the extranet, and the cloud server together form a new cloud forwarding platform to provide services for the embedded terminal and the IDE. At this point, both the embedded terminal and the IDE can access the cloud forwarding program running on the developer computer in the same way as accessing the public IP.

2. Construction of the Temporary Cloud Platform

After the principle of FRP intranet traversal has been introduced, the modification of an FRP client configuration file is also needed for the construction of the temporary cloud platform. Table 5-4 gives a description of the FRP client configuration file.

TABLE 5-4

Description of the fields of the configuration file

| Field | Description |
|---|---|
| server_addr | IP address of cloud server, set to 116.62.63.164 |
| server_port | Listen port of FRP server, set to one of the port numbers 7000-7009, such as 7000 |

TABLE 5-4-continued

Description of the fields of the configuration file

| Field | Description |
|---|---|
| [xxx_map] | xxx_map is the mapping name and is customizable |
| type | Connection type, set to tcp |
| local_ip | IP address of reader computer, usually directly set to 0.0.0.0 |
| local_port | Listen port for local service, from 0 to 65535 (wherein 80 and 443 are not available), customizable |
| remote_port | Port mapped to public network, from 0 to 65535 (wherein 80 and 443 are not available), customizable |

Based on the configuration in Table 5-4, assume the listen port for local service and the port mapped to the public network are set to 20315 for the embedded terminal and the listen port for local service and the port mapped to the public port are set to 31213 for the IDE, the mapping relationship between the cloud server and a local computer is shown in Table 5-5.

TABLE 5-5

Mapping relationship between the cloud server to the local computer

| Service | IP and port of the local computer | Mapped IP and port of the cloud server |
|---|---|---|
| UE service | 0.0.0.0: 20315 | 116.62.63.164: 20315 |
| HCI service | 0.0.0.0: 31213 | 116.62.63.164: 31213 |

Then, the client side of FRP is run, and the rule of interaction between the embedded terminal and "116.62.63.16420315" and interaction between the IDE and "116.62.63.16431213" is followed during subsequent development.

3 Design of the IDE

The invention develops a remote online integrated development environment (RO-IDE) based on the ET-RODS model. The following will give a design method in four aspects: functional support, basic functional design, core functional design and extended functional interface design.

3.1 Presentation and Functional Support of the RO-IDE

The IDE is a set of modules related to software development functions. An IDE for embedded application development often needs to have the functions such as project management, cross-compilation, cross-debugging and program download. However, existing IDEs have the programs of difficulties in configuration, poor chip versatility and poor compilation adaptability, and few solutions are available for remote online development of different chips for different communication modules. Therefore, the invention provides an RO-IDE for embedded application development.

Figure 5:
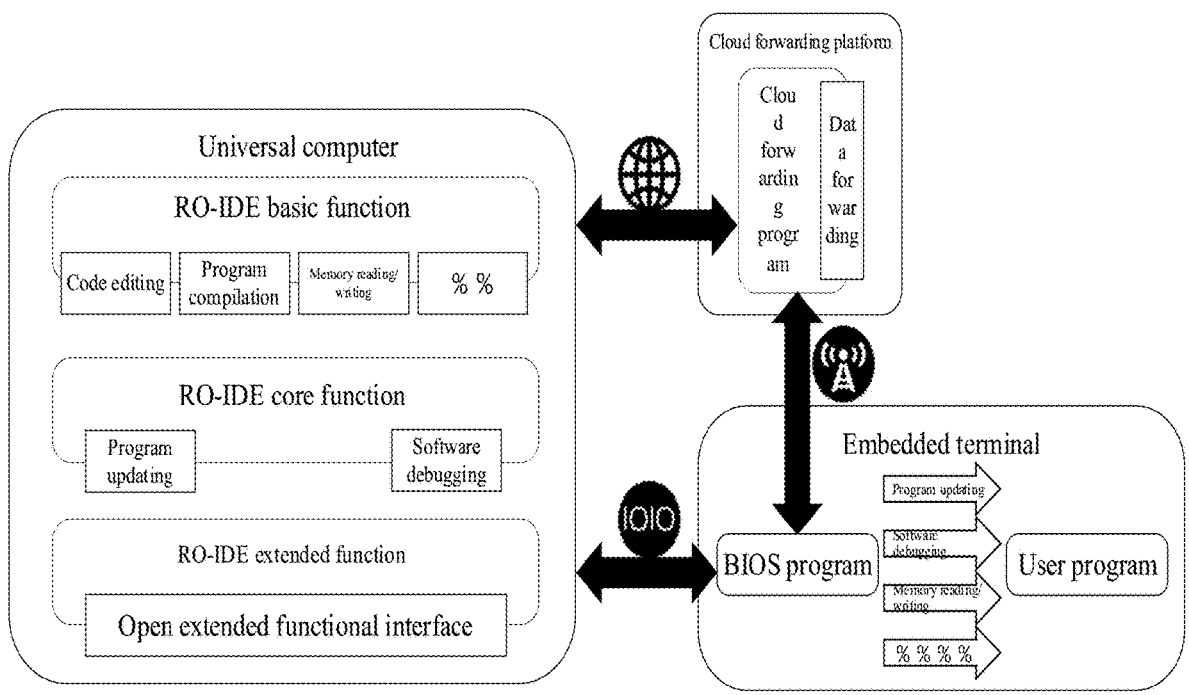
FIG. 5 illustrates a function support diagram of an RO-IDE according to one implementation of the invention.

Under the ET-RODS model, the functional support of the RO-IDE is also divided into three corresponding parts: main functional support provided by an RO-IDE software architecture on a general-purpose computer, operational execution support provided by the BIOS program of the embedded terminal, and remote communication support provided by the cloud forwarding program, as shown in FIG. 5.

Wherein, the software architecture on the general-purpose computer may either directly exchange information with the embedded terminal via a wired connection such as serial communication for local development, or remotely and wirelessly exchange information with a terminal node by using the cloud forwarding program of the cloud forwarding platform as a bridge.

In terms of the functions of all parts, the RO-IDE software architecture on the general-purpose computer, as the main site for development, is typically divided into three parts: basic functions, core functions and extended functions. Wherein, the basic functions mainly include code editing, program compilation and memory reading/writing; the core functions mainly include program updating and software debugging; the extended functions complete the access of additional functions by means of extended function interfaces. The cloud forwarding program of the cloud forwarding platform, as the bridge between the RO-IDE and the BIOS program of the terminal node, and is mainly responsible for transmitting information between these two when memory reading/writing, program updating and software debugging are carried out remotely. The BIOS program in the terminal node is reserved with an interface for interaction with the RO-IDE to assist the RO-IDE to perform memory reading/writing, program updating and software debugging for the user program.

3.2 Basic Functional Design of RO-IDE

The RO-IDE is a graphical software written in the C# language and has some basic functions for completing embedded application development such as project import and closure, code editing, project directory management, program compilation, and memory reading/writing. Design details for code editing, program compilation and memory reading/writing will be expounded below.

1. Code Editing

The code editing functions mainly include writing and deleting of codes, line annotation and paragraph annotation of codes, text finding and replacing in files, text finding and replacing in projects, code format unification, and jumping between variable/function declarations and definitions.

For the main window of code writing, the invention modifies the functions such as text finding and replacing and jumping between variable/function declarations and definitions based on the use of an open source control ICSharp-Code, in terms of the background requirements of embedded application development. Considering the nesting of micro definitions of a large number of embedded registers during embedded application development, multi-threading is used to improve the finding efficiency when specific texts are to be found, and regular expressions are used to fulfill the functions such as case-sensitive and full-word matching finding.

2. Program Compilation

The RO-IDE uses a GCC (GNU Compiler Collection) compiler, which supports multiple languages and target device extension, as a tool to complete program compilation in a GNU cross-compilation mode. In order to improve efficiency, a GNU suite provides a Make tool to shield GCC instructions and to rely on Makefile. The Makefile defines compilation and connection rules, specifies the order in which different files are compiled, and controls the generation process of an underlying program from a source code file to an executable file. The Makefile also specifies target files, dependency files and corresponding control instructions generated by compilation.

(1) Makefile template: considering the universality to different chips, the RO-IDE provides a common Makefile template for different chips, so that the program compilation of the RO-IDE has certain chip adaptability. The main format is shown in Table 5-6.

TABLE 5-6

Structure of the Makefile file template

| Main function | Example |
| --- | --- |
| Storage path for link files (.ld), dynamically modified | linkFile :=... |
| Define the name of generated files, dynamically modified | finalGoal :=... |
| Define the path where the header files are located, dynamically modified | include :=... |
| Defines optimization levels, including O0, O1, O2, Os and Og, with Og used by default | opt := Og |
| Replace .c, .cpp, .s and .S files with .o files, using .c files as an example | OBJ_CS := $(addprefix $(D_OBJ)/,$(patsubst %.c,%.o,$(notdir $(SRC_CList)))) |
| Replace .c, .cpp, .s and .S files with .d files, using .c files as an example | SRC_MK := $(addprefix $(D_OBJ)/, $(patsubst %.c,%.d,$(notdir $(SRC_CList)))) |
| Replace .c, .cpp, .s and .S files in folder ./Source with .o files, using .c file as an example | $(D_OBJ)/%.o:$(SRC_C)/%.c<br>arm-none-eabi-gcc "$?`" -mcpu=cortex-m4 -std=gnu11 -g3 -DUSE_HAL_DRIVER -DDEBUG \\<br>-DSTM32L431xx -c $(include) -$(opt) -ffunction-sections -fdata-sections -Wall -fstack-usage \\<br>-MMD -MP -M"$(@:%.o=%.d)" -MT"$@" --specs=nano.specs -mfpu-fpv4-sp-d16 -mfloat-abi=hard -mthumb -o "$@" |
| # List targets in files. The target is a file to be generated. Wherein, "all" and "clean" are pseudo targets | all:default.size.stdout $(finalGoal).lst $(finalGoal).hex $(finalGoal).elf: $(OBJ_CS)<br>arm-none-eabi-g++ -o "$(finalGoal).elf" $(OBJ_CS) -mcpu=cortex-m4 -T $(linkFile) \\<br>--specs=nosys.specs -Wl,-Map="$(finalGoal).map" -Wl, --gc-sections -static --specs=nano.specs -mfpu=fpv4-sp-d16 \\<br>-mfloat-abi=hard -mthumb -Wl,--start-group -lc -lm -lstdc++ -lsupc++ -Wl, --end-group<br>@$(printf) 'Finished building target: $@'<br>$(finalGoal).hex: $(finalGoal).elf $(finalGoal).lst<br>arm-none-eabi-objcopy -O ihex "$<" "$@" |

TABLE 5-6-continued

Structure of the Makefile file template

| Main function | Example |
|---|---|
| # Delete all intermediate files and target files and recompile them all | clean:<br>rm -rf "$(final Goal).elf" "$(finalGoal).hex" "$(finalGoal).map" "$(finalGoal).lst" "$(finalGoal).hex" $(OBJ_C) $(SRC_MK)<br>-@$(printf) 'make: clean has be done'<br>test:<br>arm-none-eabi-size $(finalGoal).elf<br>@$(printf) 'Finished building: $@'<br>-@$(printf) $(OBJ_C) |
| #Specify which targets are pseudo-targets | .PHONY: all clean test |

(1) Automated compilation: in view of the problem of other IDEs requiring tedious project configuration work before compilation, the RO-IDE overcomes the defect of reconfiguration needed whenever a project file is changed, and achieves automatic configuration of files in each directory before each compilation by traversing the project file. A "make all" command is invoked from a cmd window of the Windows system in the Makefile directory of the pre-compiled project to realize automated one-click compilation. A hyperlink is provided to users to enable the program to jump to the specific position of an error or a warning message generated after compilation.

3. Memory Reading/Writing

Memory reading/writing is a practical tool for developers to check the storage space of the current embedded terminal and is also a simple application of dynamic commands. The main operating logic of memory reading/wiring is as follows: after a connection between software on the general-purpose computer and the BIOS program of the embedded terminal is established, the software on the upper computer sends a dynamic command package for memory reading/writing to the BIOS program and requests an address range of the currently accessible memory space of the embedded terminal to the BIOS program, which is received by the upper computer and fed back in the graphical interface. At this point, the users start issue a reading/writing request to check or modify the contents of the corresponding memory space.

3.3 Core Functional Design of the RO-IDE

The core functions of RO-IDE include remote updating and debugging of embedded terminal software.

A method for remote updating of the embedded terminal software comprises:

Sending dynamic command data to a user port and writing the dynamic data by a user program;

Sending a system command for program jumping to the user port, and jumping to BIOS when the user program receives the system command;

Calling a dynamic command function by default during a BIOS starting process; modifying a program running state in a dynamic command first to complete a sta in BIOS; then, completing initialization and interrupt enable of the user port; setting an address of an interrupt service routine, corresponding to the user serial port, in a BIOS program interrupt vector table as a dynamic command function; finally, informing an upper computer that relevant initialization steps have been executed and a program update is to be started;

Starting to send user program data frames to the user port by the upper computer, and complecting receiving, checking and writing by a terminal through a dynamic command from the user port; and When the dynamic command from the user port finishes processing the last frame of data, modifying the running state of the program, resetting BIOS, and completing subsequent guidance on the user program through a BIOS base running process.

A method for remote debugging of the embedded terminal software comprises:

Dynamically loading a software debugger program through a dynamic commands system in a BIOS project, and giving a specific implementation of a necessary function for debugging in a dynamic command;

Completing relevant settings of a breakpoint with the aid of a flash address reloading and breakpoint unit, and outputting corresponding debug information in a debug monitoring exception responsible for capturing the breakpoint; and Carrying out remote software debugging by means of a full-run mode, a run-by-statement mode, a run-by-process mode and a suspend mode.

A further explanation of the parsing of machine code files for the RO-IDE is given here. Hex files are selected as target machine code files, which have the advantages of being smaller, easier to transfer and easier to parse than Elf files. The Elf files are recoded, with line as a unit and colon as a start symbol, sequentially according to length, offset, record type, valid data and checksum. data and checksum. The parsing of the Hex files is illustrated in Table 5-7 with specific examples.

TABLE 5-7

Method for parsing data lines of Hex files

| Field | Length (byte) | Meaning | Example |
|---|---|---|---|
| Start symbol | 1 | Start of line data of Hex file | : |
| Length | 1 | Length of this record | 10 |
| Offset | 2 | Offset with respect to the start address of Flash | 3660 |
| Record type | 1 | 00: Data record<br>01: End-of-file record<br>02: Extended segment address<br>03: Start segment address<br>04: Extended linear address<br>05: Link start address | 00 |
| Valid data | N | Specific contents | 1A6842F420121A60 5A6A22F47F625A62 |
| Checksum | 1 | Check the validity of data | 2F |

3.4 Extended Functional Interface Design of the RO-IDE

In the development process, in addition to the IDE, developers may also use various external tools, and in order to adapt to such development needs and provide greater convenience, the RO-IDE provides extended function interfaces to achieve direct invocation of the external tools. With the idea of shortcuts, users only need to configure a path for these external tools once to achieve direct invocation of the external tools in the RO-IDE, which improves the extendibility of programs to a certain extent.

The above description is merely used to explain preferred specific implementations of the invention, and is not intended to limit the protection scope of the invention. All variations or substitutions easily obtained by any skilled in the art within the technical scope disclosed by the invention should fall within the protection scope of the invention. Thus, the protection scope of the invention should be subject to the protection scope of the appended claims.

What is claimed is:

1. An embedded terminals remote online development system, comprising:
    an embedded terminal, a cloud forwarding platform and an integrated development environments (IDE) module, wherein the cloud forwarding platform establish a communication connection with the IDE module through Internet, and establishes a connection with a communication module of the embedded terminal through a communication base station; and the IDE module established a connection with the embedded terminal in a wired manner;
    the IDE module is capable of entering remote updating of embedded terminal software, comprising:
    sending dynamic command data to a user port, and writing the dynamic command data by a user program;
    sending a system instruction for program jumping to the user port, and jumping to Basic Input/Output System (BIOS) after the user program receives the system instruction;
    calling a dynamic command function by default during a BIOS starting process; modifying a program running state in a dynamic command first to complete a stay in BIOS; then, completing initialization and interrupt enable of the user port; setting an address of an interrupt service routine corresponding to the user port in a BIOS program interrupt vector table as the dynamic command function; finally, informing an upper computer that relevant initialization steps have been executed and a program update is to be started;
    starting to send data frames of the user program to the user port by the upper computer, and receiving, checking and writing the data frames of the user program by the terminal by means of the dynamic command from the user port; and
    when the dynamic command from the user port finishes processing the last frame of data, modifying the program running state, resetting BIOS, and completing subsequent guidance on the user program by means of a BIOS basic process,
    wherein the embedded terminal comprises a hardware platform, nad the hardware platform comprises a master chip minimal system, a communication module and a peripheral circuit thereof, a power conversion circuit, and an access sensor;
    wherein the cloud forwarding platform comprises a cloud server and a developer computer, a server side of an intranet traversal software Fast Reverse Proxy (FRP) runs on the cloud server, a client side and a cloud forwarding program of the intranet traversal software FRP run on the developer computer, and an address and a port of the cloud server are mapped onto the developer computer; and
    wherein the IDE module is capable of entering remote debugging of embedded terminal software and comprises:
        dynamically loading a software debugging program by means of a dynamic command system in a BIOS project, and providing a specific implementation of a necessary function for debugging in a dynamic command;
        completing relevant settings of a breakpoint by means of a flash address reloading and breakpoint unit, and outputting corresponding debugging information in a debug monitoring exception responsible for capturing the breakpoint; and
        carrying out remote software debugging by means of a full-run mode, a run-by-statement mode, a run-by-process mode and a suspend mode.

2. The embedded terminals remote online development system according to claim 1, wherein:
    the embedded terminal and the IDE module uplink and downlink data to the cloud forwarding platform with a fixed IP address, and the cloud forwarding platform is response for forwarding data, so that information exchange between the embedded terminal and the IDE module is completed.

3. The embedded terminals remote online development system according to claim 1, wherein:
    the IDE module has functions of code editing, code analysis, program compilation, software debugging, software updating, and memory reading/writing.

4. The embedded terminals remote online development system according to claim 3, wherein:
    the code editing function comprises: writing and deleting of codes, line annotation and paragraph annotation of codes, text finding and replacing in files, text finding and replacing in projects, code format unification, and jumping between variable/function declarations and definitions.

5. The embedded terminals remote online development system according to claim 3, wherein: the program compilation function completes program compilation in a GNU's Not Unix (GNU) cross-compiling mode, with a GNU Compiler Collection (GCC) compiler supporting multiple languages and target device extension as a tool.

6. The embedded terminals remote online development system according to claim 1, wherein:
    the cloud forwarding platform is response for forwarding data between the embedded terminal and the IDE module.

* * * * *